UNITED STATES PATENT OFFICE.

HUGH RODMAN AND GEORGE M. HOWARD, OF PHILADELPHIA, PENNSYLVANIA, ASSIGNORS TO THE ELECTRIC STORAGE BATTERY COMPANY, A CORPORATION OF NEW JERSEY.

SECONDARY OR STORAGE BATTERY.

No. 875,213.  Specification of Letters Patent.  Patented Dec. 31, 1907.

Application filed December 22, 1905. Serial No. 293,042.

*To all whom it may concern:*

Be it known that we, HUGH RODMAN and GEORGE M. HOWARD, citizens of the United States, residing at the city of Philadelphia, in the county of Philadelphia and State of Pennsylvania, have jointly invented certain new and useful Improvements in Secondary or Storage Batteries, of which the following is a specification.

The advantages which result from the incorporation with the active material or lead oxid of the negative pole plate of a storage battery, of an inert material insoluble in the electrolyte and in finely divided condition are well understood and availed of in practice.

It is the object of the present invention to provide for such purpose an inert material especially adapted for producing such advantageous results and while insoluble in the acid yet also capable of being obtained in an exceedingly finely divided condition.

The material which we employ is an insoluble sulfate. Sulfate of barium, sulfate of strontium and sulfate of calcium in non-setting form are examples of such insoluble sulfate. The best substance known to us at this time for the purpose is sulfate of barium and the best form of sulfate of barium is cold precipitated sulfate of barium. An appropriate way of preparing what we call cold precipitated sulfate of barium is to precipitate it from a cold solution of a soluble salt of barium by the use of sulfuric acid. The cold precipitated sulfate of barium can be obtained in a state of exceedingly fine subdivision and it is insoluble in the electrolyte which is employed in connection with lead electrodes and which contains sulfuric acid. The cold precipitated sulfate of barium is mixed with the lead oxid in, for example, the proportion of 5% more or less by weight and the mixture is mounted in a suitable frame or support in any well understood way so as to constitute a secondary or storage battery negative pole plate. The use of finely divided insoluble sulfate as the inert material imparts to the negative pole plate active material upon reduction and discharge a very desirable loose structure which may be due in part to the stability of sulfates in the presence of sulfuric acid or to the fact that it may be very uniformly mixed with the active material.

By the use of the described inert material the characteristic loose structure is created by uniform expansion throughout the mass of active material, marked uniformity in the capacity of a large number of plates as commercially manufactured and containing the active material of loose structure is attained, the capacity of the active material maintained in a loose structure is very uniform throughout the life of the plate and the useful life of the plate is greatly prolonged. Furthermore active material maintained in a loose structure by the described inert material has the characteristic that its structure is maintained in a loose expanded condition throughout the mass of active material in contradistinction to having a loose structure imparted to its surface, which latter has the disadvantage of causing the plate to shed and disintegrate at its surface. The described inert material may be obtained of a specific gravity sufficiently high to enable it to be readily mixed and maintained throughout the mass of lead active material and this is particularly true of sulfate of barium.

It will be obvious to those skilled in the art to which our invention relates that modifications may be made in details without departing from the spirit thereof, hence the invention is not limited further than the prior state of the art may require, but

Having thus described the nature and objects of our invention, what we claim as new and desire to secure by Letters Patent is

1. Active material or material adapted to become active for the negative pole plates of storage batteries consisting of lead or lead oxid containing non-setting insoluble and inert sulfate, substantially as described.

2. Active material or material adapted to become active for the negative pole plates of storage batteries consisting of lead or oxid of lead containing sulfate of barium, substantially as described.

3. Active material or material adapted to become active for the negative pole plates of storage batteries consisting of lead or an oxid of lead containing precipitated sulfate of barium, substantially as described.

4. Active material or material adapted to become active for the negative pole plates of storage batteries consisting of lead or an oxid of lead containing sulfate of barium precipitated from a cold solution, substantially as described.

In testimony whereof we have hereunto signed our names in the presence of witnesses.

HUGH RODMAN.
GEORGE M. HOWARD.

Witnesses as to Hugh Rodman:
W. S. HALL,
R. NORBERG.

Witnesses as to George M. Howard:
WM. C. DU BOIS,
LEONARD H. WORNE.